United States Patent [19]

Bohman

[11] Patent Number: 5,033,031

[45] Date of Patent: * Jul. 16, 1991

[54] UNDERGROUND ULTRASONIC TILLAGE DEPTH SENSOR

[75] Inventor: Carl E. Bohman, New Holland, Pa.

[73] Assignee: Ford New Holland, New Holland, Pa.

[*] Notice: The portion of the term of this patent subsequent to Sep. 11, 2007 has been disclaimed.

[21] Appl. No.: 462,720

[22] Filed: Jan. 9, 1990

[51] Int. Cl.$^5$ .................... G01S 15/00; E02F 9/20
[52] U.S. Cl. .................... 367/96; 367/140; 181/124; 172/4
[58] Field of Search .................... 367/140, 190, 96, 99, 367/118, 127; 181/123, 124, 402; 172/4, 239; 342/70, 123

[56] References Cited

U.S. PATENT DOCUMENTS

| | | | |
|---|---|---|---|
| 2,932,818 | 4/1960 | Lubkin | 340/244 |
| 3,039,087 | 6/1962 | Huston | 340/282 |
| 3,058,242 | 10/1962 | Ochnashek | 172/4 |
| 4,282,933 | 8/1981 | Suganami et al. | 172/4.5 |
| 4,573,124 | 2/1986 | Seiferling | 364/424 |
| 4,600,356 | 7/1986 | Bridges et al. | 414/694 |
| 4,657,087 | 4/1987 | Livneh | 172/3 |
| 4,697,254 | 9/1987 | Pridham | 367/92 |
| 4,733,355 | 3/1988 | Davidson et al. | 364/424 |
| 4,750,117 | 6/1988 | Gregory | 364/563 |
| 4,775,440 | 10/1988 | Nishida et al. | 364/424.07 |
| 4,918,608 | 4/1990 | Middleton et al. | 172/4 |
| 4,955,437 | 9/1990 | Bohman | 172/4 X |

FOREIGN PATENT DOCUMENTS 1367882 1/1988 U.S.S.R. .

Primary Examiner—Brian S. Steinberger
Attorney, Agent, or Firm—Shlesinger Arkwright & Garvey

[57] ABSTRACT

A device for determining the depth below the ground surface of a working member of an earth moving equipment, comprises a sensor for transmitting ultrasonic signal from underneath and toward the ground surface and for receiving a portion of the signal reflected from the ground surface. The sensor is positioned underneath the ground surface in fixed spatial relationship to the working member such that the sensor means is under the ground surface when at least a portion of the working member is under the ground surface. A circuit is provided for processing the received reflected signal to thereby indicate the depth under the ground surface of the working member, whereby the depth is proportional to the time of travel of the signal to the ground surface and the reflected signal to the sensor means.

23 Claims, 1 Drawing Sheet

UNDERGROUND ULTRASONIC TILLAGE DEPTH SENSOR

FIELD OF THE INVENTION

The present invention relates generally to an earth moving equipment and in particular to an apparatus for maintaining a portion of a working member of a cultivating or an earth moving equipment at a predetermined depth below the ground surface.

BACKGROUND OF THE INVENTION

Most earth moving operations, such as grading, scraping, tilling and plowing are performed with manual depth control, based on an operator's judgment and/or experience. Often, the operator's vision is obscured such that he cannot observe the depth of the working member to any degree of precision. Several sensing approaches have been suggested which employ transducers which are mounted such as to sense distance to the ground from a point above the ground. These are typically plagued with errors due to rubble, snow, ice or puddles of water on the ground surface. Also, vibrations imparted to the transducers affect their accuracy.

OBJECTS AND SUMMARY OF THE INVENTION

It is therefore an object of the present invention to provide a depth sensor for a working member of an earth moving equipment which manually or automatically maintains the working member at a predetermined depth.

It is another object of the present invention to provide a depth sensor which is mounted on a portion of a working member of an earth moving equipment so that it protrudes into the ground ahead of the rest of the working member.

It is yet another object of the present invention to provide a depth sensor for a working member of an earth moving equipment which does not require an above-ground mounting structure for positioning the sensor.

It is still another object of the present invention to provide a depth sensor for a working member of an earth moving equipment which is immune to rubble, ice or snow, or water puddles on the ground surface.

It is another object of the present invention to provide a depth sensor for a working member of an earth moving equipment which is immune to vibrations of the earth moving equipment during operation.

It is a further object of the present invention to provide a depth sensor for a working member of an earth moving equipment which can maintain the predetermined working depth of the working member regardless of soil type, temperature, moisture and other ground conditions.

It is an object of the present invention to provide a depth sensor for a working member of an earth moving equipment which provides an output proportional to the working depth of the working member.

In summary, the present invention provides a depth sensor which is disposed on a fixed spatial relationship with the working member of an earth moving equipment such that the senor senses the depth of the working member from underneath the ground surface, thereby obviating the problems associated with prior art above-ground depth sensors.

These and other objects of the present invention will become apparent from the following detailed description.

BRIEF DESCRIPTIONS OF THE DRAWINGS

DETAILED DESCRIPTION OF THE INVENTION

FIGS. 1 AND 2

Figure 1:
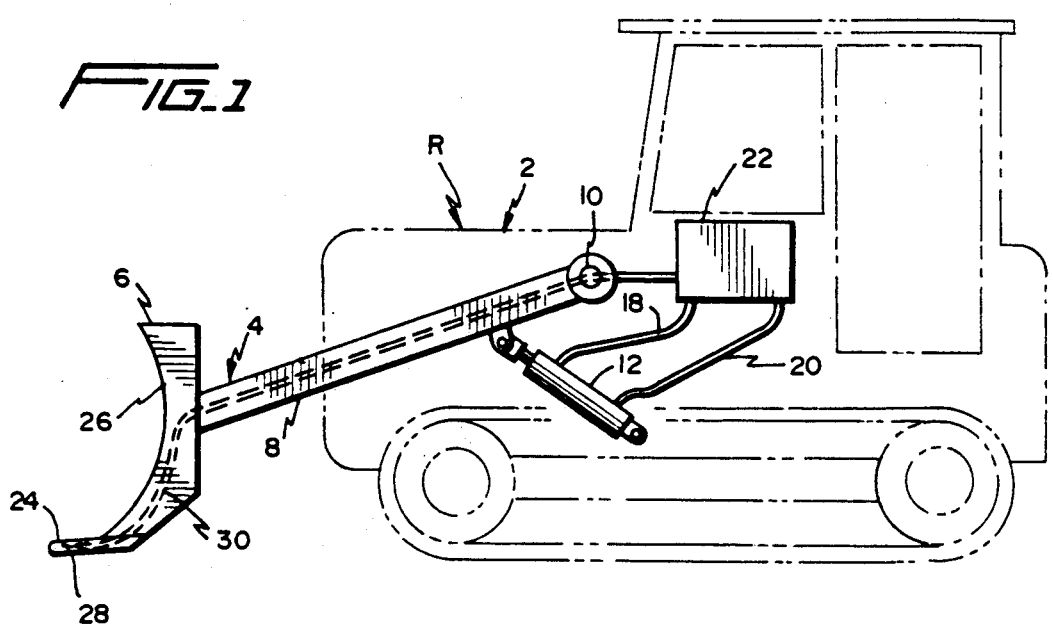
FIG. 1 is schematic side elevational view of an earth moving equipment, with portions shown in dashed lines, utilizing the present invention.

An earth moving equipment R utilizing the present invention is disclosed in FIG. 1. The equipment R includes a self-propelled vehicle 2 (shown in dashed lines) and an earth moving assembly 4 operably secured to the vehicle 2. The assembly 4 includes a working member 6 which is operably secured to the vehicle 2 with a pair of arms 8 (only one shown). Each arm 8 at one of its ends is secured to the working member 6 while the other end is pivotally secured to the vehicle 2 by means of pivot 10. An actuator 12 is associated with each arm 8 for moving the working member 6 upwardly or downwardly about each pivot 10 as needed during an earth moving operation. Each actuator 12 is advantageously a double acting piston/cylinder assembly having input-/output lines 18 and 20, thereby permitting the same actuator 12 to both raise and lower the working member 6. A person skilled in the art will understand that each actuator 12 may use a hydraulic, pneumatic or other working fluid. A controller 22 is operably connected to each actuator 12 by means of the input/output lines 18 and 20. The controller 22 permits an operator in the vehicle 2 to maintain the working member 6 either manually or automatically at a predetermined depth as will be discussed below.

The earth moving equipment disclosed in FIG. 1 is a conventional bulldozer where the working member 6 is a conventional blade for grading, digging or otherwise moving the ground. A person skilled in the art will understand that the equipment R can take on many forms, such as a farm tractor, trencher, pipe-laying equipment, crawler, backhoe, etc.

Figure 2:
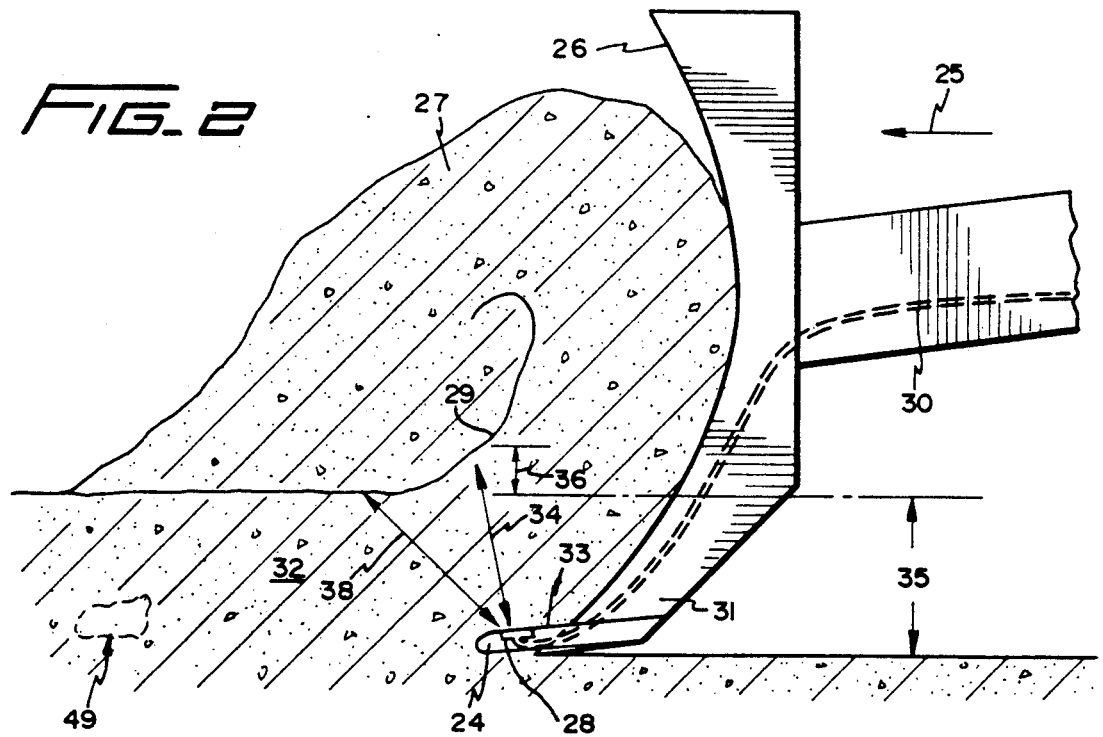
FIG. 2 is an enlarged fragmentary side elevational view of a working member of the equipment of FIG. 1.

The working member 6 includes a cutting edge portion 24 disposed along the bottom portion thereof. The cutting edge portion 24 is ahead of the direction of travel 25 of the equipment R, thereby permitting the edge portion 24 to lead the rest of the working member 6 during operation, as best shown in FIG. 2. In this manner, the edge portion 24 is disposed in relatively undisturbed ground during a digging action. The working member 6 also includes an inwardly curved surface 26 for pushing the rubble 27 generated during the digging operation. Disposed on the edge portion 24 is a sensor 28 for transmitting an ultrasonic signal from underneath to the ground surface 29 and for receiving a portion of the signal reflected from the ground surface 29. Alternatively separate transmitter and receiver units laterally disposed on the edge portion on the edge portion 24 m;aybe used. Since the edge portion 24 is at the bottom of member 6, the sensor 28 is assured of being underneath the ground surface 29 whenever a portion 31 of the working member 6 is underneath the ground 32. The sensor 28 is also preferably disposed on a top surface 33 of the edge portion 24. A person skilled in the art will understand that the sensor 28 is mounted to the working member 6 in such a way that it will withstand the rigors and stresses of the operating environment. Wires 30 operably connect the sensor 28 to the controller 22.

Although the working member 6 is disclosed as a standard bulldozer blade, a person skilled in the art will understand that the working member 6 can take on many shapes, including a plow, a scraper, a claw, etc., depending on the particular application of the equipment R.

The sensor 28 is disposed on the edge 24 in a fixed spatial relationship to the working member 6 so that the depth of the working member portion 31 may be determined in reference to the location of the sensor 28 relative to the working member 6. The sensor 28 may be located anywhere on the front portion of the portion 31 of the member 6 so that the sensor 28 is underneath the ground surface 29 in a relatively undisturbed portion of the ground 32 and is permitted to send out and receive a signal from the ground surface 29.

The sensor 28 includes means for generating and transmitting an ultrasonic signal towards the ground surface 29. The sensor 28 also includes means for receiving at least a portion of the transmitted signal reflected back to the sensor 28 from the ground surface 29. A person skilled in the art will understand that a wave propagating through a medium will be refracted when it encounters another medium and a portion of the wave will be reflected by the boundary between the two media. The ground surface 29 is an interface between the ground 32 and the rubble 27 generated during operation. The rubble 27 has a different wave propagating characteristics since it is less compacted than the undisturbed ground 32. Therefore, the ground surface 29 acts as a boundary between two media where a propagating wave is reflected and refracted.

A person skilled in the art will understand that the ground surface 29 can be any surface which forms a boundary within the ground between two dissimilar types of materials with different wave propagating characteristics, such as the boundary between the ground and the atmosphere, hard clay and top soil, virgin soil and fill, compacted fill and loose fill, and so forth.

Figure 3:
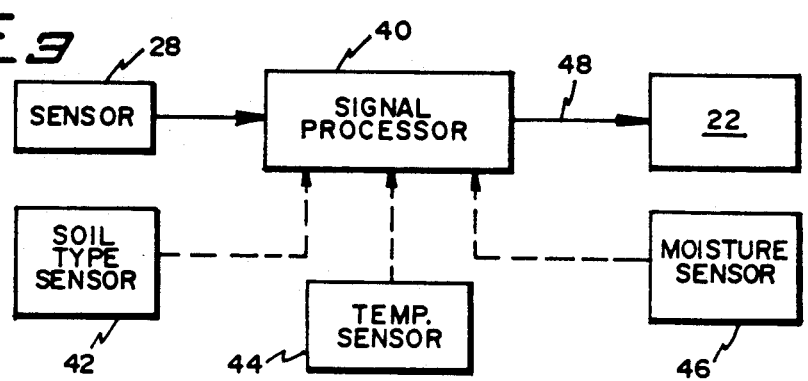
FIG. 3 is a functional block diagram of a depth sensor according to the present invention.

The propagation of the ultrasonic signal from the sensor 28 through the distance 34 to the ground surface 29 is a measure of the depth of the edge portion 24, as indicated generally by the distance 35. The amount of lifting of the ground surface 29, as generally indicated by 36, can be predetermined so that the true working depth 35 of the member 6 can be determined from the distance 34. This ground lifting may be proportional to soil type, moisture, temperature, etc. With knowledge of these factors as provided by additional sensors for temperature, moisture, pressure, etc., as best shown in FIG. 3, electronic compensation can be effected such that the signal traversing the distance 34 can be adjusted to depict the actual working depth 35.

A person skilled in the art will understand that the sensor 28 can be aimed to direct its signal towards the undisturbed horizontal ground surface and traverse the distance generally indicated by 38. In this manner, the depth 35 of the working member 6 can be obtained by simple trigonometry from knowledge of the angle the signal makes with the horizontal. In this manner, separate sensors for determining the lifting distance 36 of the ground surface 29 is not necessary to arrive at the depth 35.

FIG. 3

The sensor 28 transmits ultrasonic signals through the distance 34 towards the ground surface 29. A portion of the signal is reflected from the ground surface 29 and is received by the sensor 28. The reflected signal is processed in a signal processor 40. The signal processor 40 preferably includes means for averaging the reflected signal for air pockets, bottles, pipes, rocks, etc. Inputs from other sensors 42, 44 and 46 may be fed to the signal processor 40 to compensate the output 48 of the signal processor 40 for the lifting distance 36 such that the output 48 is proportional to the depth 35 of the working member 6. The sensor 42 provides data on soil type, whether it is clay, loam, sandy, etc. The sensor 44 provides information on soil temperature. The sensor 46 provides data on moisture content of the soil. The output 48 is provided to the controller 22 to maintain the depth 35 at a preset level The information provided by the sensors 42, 44 and 46 may also be fed manually by the operator into the signal processor 40 or into the controller 22 based on his own separate observations of the soil conditions prior to each operation.

The controller 22 may be automatic, whereby each actuator 12 is automatically activated to maintain the preset depth 35 based on the output 48 of the signal processor 40. The control 22 may also be manual, wherein the output 48 from the sensor 28 is fed to a display (not shown) from which the operator can monitor the working depth 35. Based on the output on the display (not shown), the operator can then manually raise or lower the working member 6 by manually activating each of the actuator 12.

The time of travel of the wave through the distance 34 or 38 from the sensor 28 to the ground surface 29 and back to the sensor 28 is used in arriving at the distance 34 or 38. Sensor 28 and the signal processor 40 constitutes a system similar to a sonar system wherein ultrasonic energy radiating from the sensor 28 and the resulting echo scattered from the ground surface 29 is utilized for determining the working depth 35. Rather than the ultrasonic signal propagating through water as in a sonar system, the signal is propagated through the ground. Persons skilled in the art will understand that circuit implementation of the functional blocks disclosed in FIG. 3 will follow the standard principles and design considerations involved in an ultrasonic system.

In operation, the operator sets the working depth 35 of the working member 6. The working depth 35 may be dictated by the particular job, such as cutting a certain depth of ground in a grading job, plowing to a certain depth, or making sure that any object 49, as best shown in dashed lines in FIG. 2, is upturned. Once the working depth 35 is set, the sensor 28 and the associated circuitry 40 measures the working depth of the working member 6. Any deviation from the preset value causes the controller 22 to actuate the actuators 12, thereby raising or lowering the working member 6. The sensors 42, 44 and 46 provide compensation signals to the signal processor 40 for various soil conditions. Alternatively, the controller 22 or the signal processor 40 can be preprogrammed manually for the soil conditions expected in the area of operation.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A device for determining the depth below the ground surface of a working member of an earth moving equipment, said device comprising:
   a) sensor means for transmitting an ultrasonic signal from underneath and toward the ground surface and for receiving a portion of the signal reflected from the ground surface;
   b) means for positioning said sensor means underneath the ground surface in fixed spatial relationship to the working member such that said sensor means is under the ground surface when at least a portion of the working member is under the ground surface; and
   c) means connected to said sensor means for processing the received reflected signal and for indicating the depth under the ground surface of the working member portion, whereby the time of travel of the signal and the reflected signal between said sensor means and the ground surface is proportional to the depth.

2. A device as in claim 1, wherein:
   a) said sensor means is disposed ahead of the working member.

3. A device as in claim 1, wherein:
   a) said sensor means is disposed on a portion of the working member which is under the ground surface during normal use of the working member.

4. A device as in claim 3, wherein:
   a) said portion includes a leading portion; and
   b) said sensor means is disposed on said leading portion.

5. A device as in claim 4, wherein:
   a) said leading portion includes a top surface; and
   b) said sensor means is disposed on said top surface.

6. A device as in claim 1, and further comprising:
   a) means responsive to the output of said processing and indicating means for controlling the working depth of said working member.

7. A device as in claim 6, and further comprising:
   a) means connected to said processing means for compensating the output for various ground conditions.

8. Earth moving equipment, comprising:
   a) a working member operably secured to the earth moving equipment;
   b) said working member having at least a portion normally disposed at a predetermined depth from the surface of the ground during operation;
   c) sensor means for transmitting an ultrasonic signal from underneath and toward the ground surface and for receiving a portion of the signal reflected from the ground surface;
   e) means for positioning said sensor means underneath the ground surface in fixed spatial relationship to said working member portion such that said sensor means is under the ground surface when said portion is under the ground surface;
   f) means connected to said sensor means for processing the received reflected signal and for generating an output indicating the depth of said working member under the ground surface, whereby the time of travel of the signal to the ground surface and the reflected signal to said sensor means is proportional to the depth; and
   g) means responsive to the output for controlling the working depth of said working member.

9. Earth moving equipment as in claim 8, wherein:
   a) said sensor means is disposed ahead of the direction of travel of the working member.

10. Earth moving equipment as in claim 8, wherein:
    a) said sensor means is disposed on said working member portion.

11. Earth moving equipment as in claim 10, wherein:
    a) said portion includes a leading portion; and
    b) said sensor is disposed on said leading portion.

12. Earth moving equipment as in claim 11, wherein:
    a) said leading portion includes a top surface; and
    b) said sensor means is disposed on said top surface.

13. An earth moving equipment as in claim 8, wherein:
    a) said working member is a bulldozer blade; and
    b) said sensor means is disposed on said blade.

14. An earth moving equipment as in claim 8, and further comprising:
    a) means connected to said processing means for compensating the output for various ground conditions.

15. An implement, comprising:
    a) a working member;
    b) said working member having at least a portion normally disposed at a predetermined depth from the surface of the ground during operation;
    c) sensor means for transmitting an ultrasonic signal from underneath and toward the ground surface and for receiving a portion of the signal reflected from the ground surface;
    d) means for positioning said sensor means underneath the ground surface in fixed spatial relationship to the working member such that said sensor means is under the ground surface when at least a portion of the working member is under the ground surface; and
    e) means connected to said sensor means for processing the received reflected signal for generating an output indicating the depth of said working member under the ground surface, whereby the time of travel of the signal to the ground surface and the reflected signal to said sensor means is proportional to the depth.

16. An implement as in claim 15, wherein:
    a) said sensor means is disposed on said working member portion.

17. An implement as in claim 15, wherein:
    a) said working member portion includes a leading portion; and
    b) said sensor means is mounted on said leading portion.

18. An implement as in claim 17, wherein:
    a) said leading portion includes a top surface; and
    b) said sensor means is disposed on said top surface.

19. An implement as in claim 15, wherein:
    a) said working member is a bulldozer blade; and
    b) said sensor means is disposed on said blade.

20. An implement as in claim 15, and further comprising:

a) means connected to said processing means for compensating the output for various ground conditions.

21. A method for determining the working depth of a working member of an earth moving equipment, comprising the steps of:
   a) providing sensor means for transmitting an ultrasonic signal from underneath and toward the ground surface and for receiving a portion of the signal reflected from the ground surface;
   b) positioning the sensor means underneath the ground surface in fixed spatial relationship to the working member such that the sensor means is under the ground surface when at least a portion of the working member is under the ground surface;
   c) transmitting an ultrasonic signal toward the ground surface;
   d) receiving a portion of the transmitted signal which is reflected from the ground surface;
   e) processing the received reflected signal to thereby indicate the depth under the ground surface of the working member, whereby the time of travel of the signal and the reflected signal between said sensor means and the ground surface is proportional to the depth.

22. A method for determining the working depth as in claim 21, and including the step of:
   a) providing means for compensating the time of travel of the transmitted and reflected signal due to varying soil conditions.

23. A method for determining the working depth as in claim 22, and including the step of:
   a) controlling the working depth of the working member.

* * * * *